United States Patent
Hamdan et al.

(10) Patent No.: US 9,227,563 B2
(45) Date of Patent: Jan. 5, 2016

(54) BACKWARD MOVEMENT INDICATOR APPARATUS FOR A VEHICLE

(75) Inventors: Majed M Hamdan, North Olmstead, OH (US); Ananda Pandy, Rochester Hills, MI (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 377 days.

(21) Appl. No.: 13/617,002

(22) Filed: Sep. 14, 2012

(65) Prior Publication Data

US 2014/0078302 A1 Mar. 20, 2014

(51) Int. Cl.
| | |
|---|---|
| *B60Q 11/00* | (2006.01) |
| *B60Q 1/52* | (2006.01) |
| *B60Q 9/00* | (2006.01) |
| *G06K 9/00* | (2006.01) |

(52) U.S. Cl.
CPC ............... *B60Q 1/525* (2013.01); *B60Q 9/005* (2013.01); *B60Q 9/008* (2013.01); *G06K 9/00805* (2013.01); *G06K 9/00812* (2013.01)

(58) Field of Classification Search
CPC ............................. G08G 1/166; G08G 1/165
USPC ............................ 701/41, 70; 340/936, 937
See application file for complete search history.

(56) References Cited

U.S. PATENT DOCUMENTS

| | | | |
|---|---|---|---|
| 6,542,085 B1 | 4/2003 | Yang | |
| 6,590,719 B2 | 7/2003 | Bos | |
| 2005/0075770 A1 | 4/2005 | Taylor et al. | |
| 2005/0093975 A1* | 5/2005 | Hamdan | B60R 1/00 348/118 |
| 2005/0190262 A1* | 9/2005 | Hamdan | 348/148 |
| 2007/0098279 A1* | 5/2007 | Hahn et al. | 382/238 |
| 2010/0226544 A1* | 9/2010 | Uchida | B60R 1/00 382/107 |
| 2011/0103650 A1 | 5/2011 | Cheng et al. | |
| 2011/0128161 A1 | 6/2011 | Bae et al. | |
| 2011/0199199 A1* | 8/2011 | Perkins | 340/435 |
| 2011/0282581 A1 | 11/2011 | Zeng | |

OTHER PUBLICATIONS

Ho Gi Jung & Dong Suk Kim, "Active Pedestrian Protection System", 2010, p. 1-12.*
K. Prazdny, "Egomotion and Relative Depth Map from Optical Flow", Biological Cybernetics 36, 87 102 (1980) by Springer-Verlag, 0340-1200/80/0036/0087.*
Carlo Tomasi & Jianbo Shi,"Direction of Heading from Image Deformations", 1063-6919/93 $03.00 0 1993 IEEE, p. 422-427.*
Jung, Ho Gi, et al. "Sensor fusion based obstacle detection/classification for active pedestrian protection system." Advances in Visual Computing. Springer Berlin Heidelberg, 2006. 294-305.*
Prazdny, K. "Egomotion and relative depth map from optical flow." Biological cybernetics 36.2 (1980): 87-102.*

(Continued)

*Primary Examiner* — Sath V Perungavoor
*Assistant Examiner* — Clifford Hilaire
(74) *Attorney, Agent, or Firm* — Cheryl L. Greenly; Brian E. Kondas; Eugene E. Clair

(57) ABSTRACT

A backward movement indicator apparatus is provided for a vehicle having an alert device. The backward movement indicator apparatus comprises an image capture device arranged to capture image data which is representative of objects in vicinity of the vehicle. The backward movement apparatus further comprises an electronic controller arranged to process the captured image data to provide a signal which is indicative of the vehicle moving backwards.

12 Claims, 3 Drawing Sheets

(56) References Cited

OTHER PUBLICATIONS

Tomasi, Carlo, and Jianbo Shi. "Direction of heading from image deformations."Computer Vision and Pattern Recognition, 1993. Proceedings CVPR'93., 1993 IEEE Computer Society Conference on. IEEE, 1993.*

Tomasi, Carlo, and Jianbo Shi. "Direction of heading from image deformations." Computer Vision and Pattern Recognition, 1993. Proceedings CVPR'93., 1993 IEEE Computer Society Conference on. IEEE, 1993.*

Yang, Ming, et al. "Laser radar based real-time ego-motion estimation for intelligent vehicles." Intelligent Vehicle Symposium, 2002. IEEE. vol. 1. IEEE, 2002.*

PCT Notification of Transmittal of the Int'l Search Rpt and the WO of the Int'l Searching Authority, or the Declaration, Aug. 2, 2013, 16 pgs, Int'l Searching Authority/US.

* cited by examiner

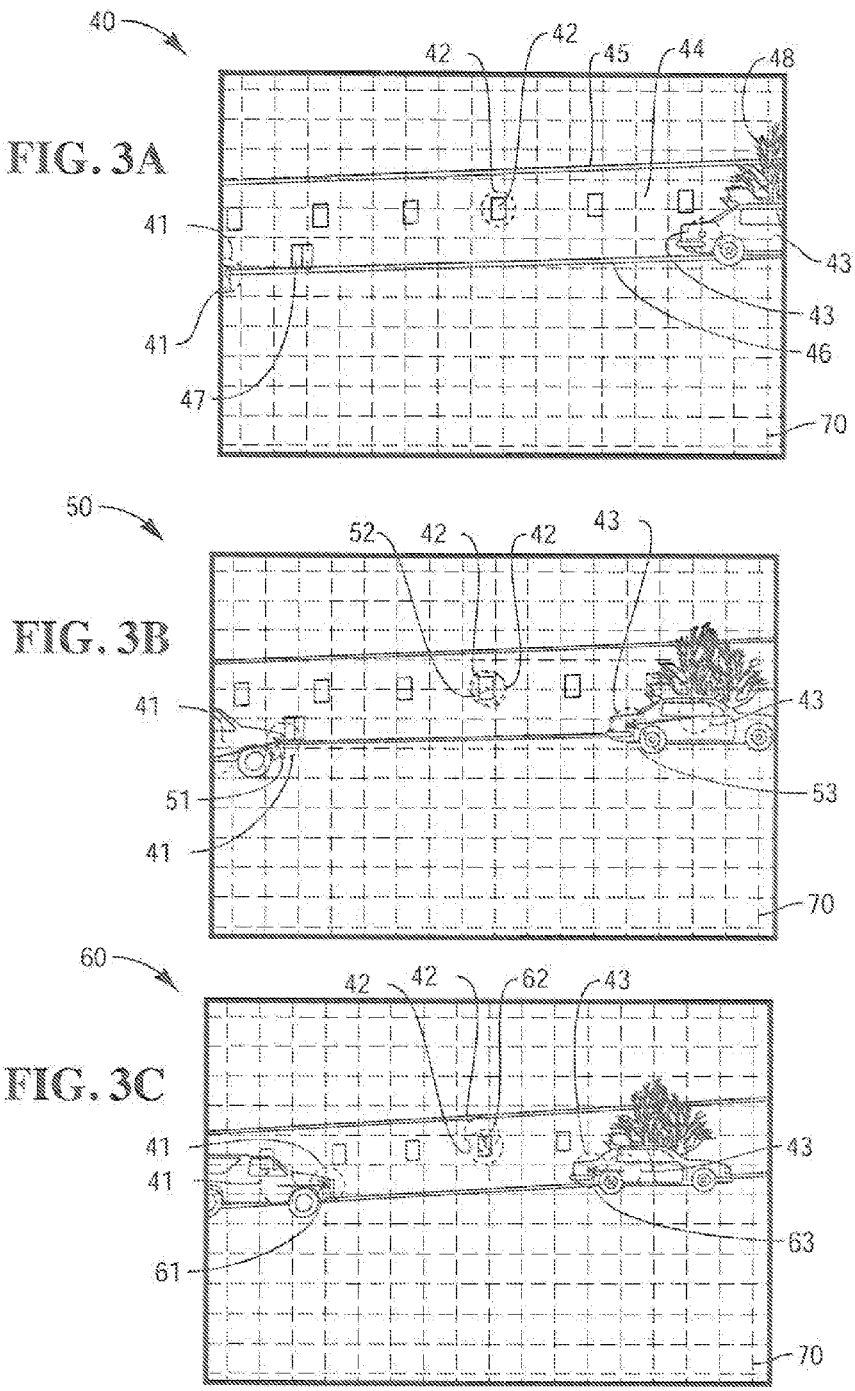

BACKWARD MOVEMENT INDICATOR APPARATUS FOR A VEHICLE

BACKGROUND

The present application relates to vehicles moving backwards, and is particularly directed to a backward movement indicator apparatus for a vehicle, such as a truck.

When a truck driver desires to backup the truck, the driver shifts transmission of the truck into reverse gear. In some trucks, a position sensor is operatively coupled to the transmission to detect when the transmission is in reverse gear. The reverse gear position sensor provides a signal when the reverse gear position sensor detects that the transmission is in reverse gear. A drawback in using a reverse gear position sensor is that sometimes the truck may not actually be moving backwards even though the signal from the reverse gear position sensor indicates otherwise. Another drawback in using a reverse gear position sensor is that sometimes the truck can be moving backwards without the transmission being in reverse gear. A reverse gear position sensor can therefore sometimes provide either a false indication of the truck moving backwards or a false indication of the truck not moving backwards.

In some other trucks, a speed sensor is operatively coupled to a wheel of the truck to provide a signal indicative of ground speed of the vehicle. In this case, some types of wheel speed sensors and exciter ring assemblies provide a signal indicative of the truck moving backwards when the wheel speed sensor detects that the truck wheels are turning in the backward direction at a rate which exceeds a predetermined rate. A drawback in using a wheel speed sensor is that sometimes the truck may actually be moving backwards even though the signal from the wheel speed sensor indicates otherwise. This can occur because a typical variable reluctance wheel speed sensor does not produce an output at very tow wheel turning speeds such as when the truck is rolling slowly backwards. It would be desirable to provide a reverse movement indicator apparatus which provides a true indication of when the truck is actually moving backwards.

SUMMARY

In accordance with one embodiment, a backward movement indicator apparatus is provided for a vehicle having an alert device. The backward movement indicator apparatus comprises an image capture device arranged to capture image data which is representative of objects in vicinity of the vehicle. The backward movement apparatus further comprises an electronic controller arranged to process the captured image data to provide a signal which is indicative of the vehicle moving backwards.

BRIEF DESCRIPTION OF THE DRAWINGS

FIGS. 3A, 3B, and 3C show successive image frames which are captured and processed in the method of FIG. 2.

DETAILED DESCRIPTION

Figure 1:
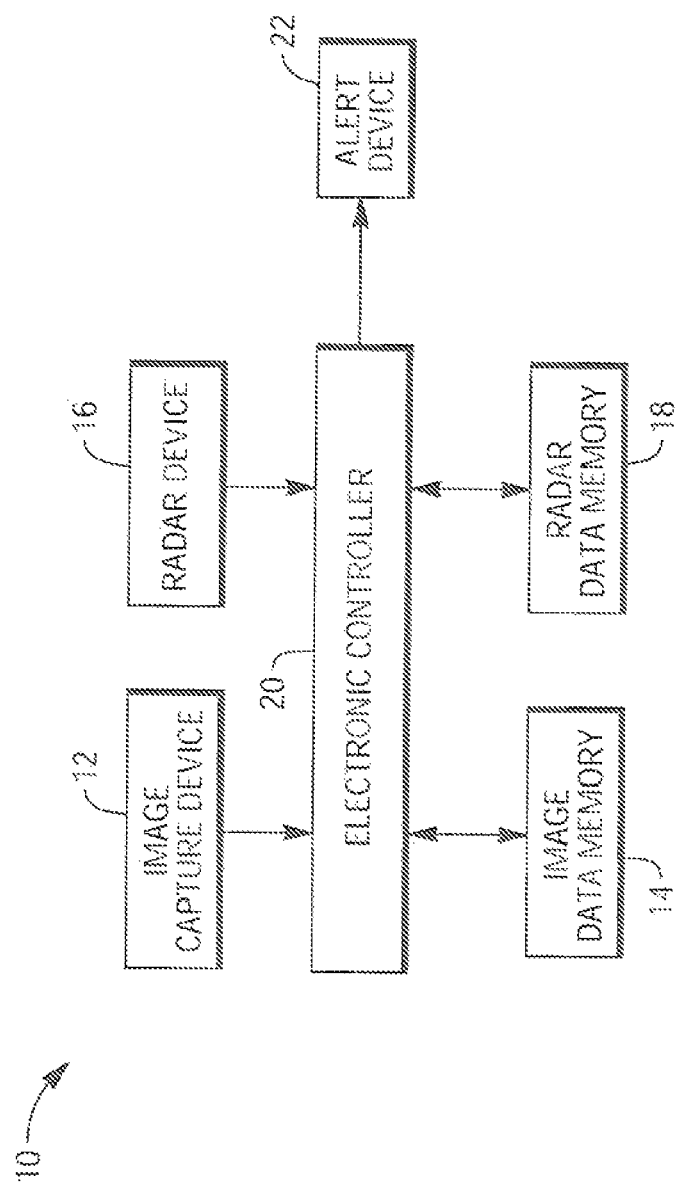
FIG. 1 is a schematic block diagram showing a backward movement indicator apparatus constructed in accordance with an embodiment.

Referring to FIG. 1, apparatus 10 is provided for use in a vehicle such as a truck. Apparatus 10 is constructed in accordance with one embodiment.

Image capture device 12 captures image data which is representative of objects in front of the vehicle. Image capture device 12 may be mounted on a dashboard of the vehicle. Other mounting locations for image capture device 12 are possible. As an example, image capture device 12 may comprise a forward looking camera such as the one available in the Autovue® lane departure warning system from Bendix Commercial Vehicle Systems LLC located in Elyria, Ohio. Camera 12 truly comprise any conventional type of high-speed digital video camera which captures image data in real time.

Radar device 16 captures radar data which is representative of objects in front of the vehicle. Radar device 16 may be mounted in front bumper area or hood area of the vehicle. Other mounting locations for radar device 16 are possible. As an example, radar device 16 may comprise the radar detector as found in the Wingman® ACB system available from Bendix Commercial Vehicle Systems LLC located in Elyria, Ohio. Radar 16 may comprise any conventional type of radar suitable for use in a vehicle. Although camera 12 and radar 16 are shown separately in FIG. 1, it is conceivable that they may be integrated as a single unit.

Electronic controller 20 receives captured image data from camera 12, and stores the captured image data in image data memory 14. Controller 20 also receives captured radar data from radar 16, and stores the captured radar data in radar data memory 18. Controller 20, camera 12, image data memory 14, radar 16, and radar data memory 18 may comprise part of a conventional vehicle visioning system, as is known. Certain components of the vehicle visioning system may depend upon the particular type of vehicle in which the visioning system is installed. Structure and operation of vehicle visioning systems including controllers, cameras, radars, and data memories are known and, therefore, will not be described.

Controller 20 provides one or more signals to alert device 22. Alert device 22 may be located in the vehicle and may include any combination of visual, audible, and haptic devices, for examples. Alternatively, or in addition to, alert device 22 may be located outside of the vehicle and may include any combination of visual and audible devices, for examples.

Components of apparatus 10 may be powered on when vehicle ignition is turned on. Components of apparatus 10 co-operate to provide an indicator that the vehicle is moving backwards when the vehicle is actually moving backwards. The backward movement indicator is provided in accordance with a method to be described hereinbelow.

Figure 2:
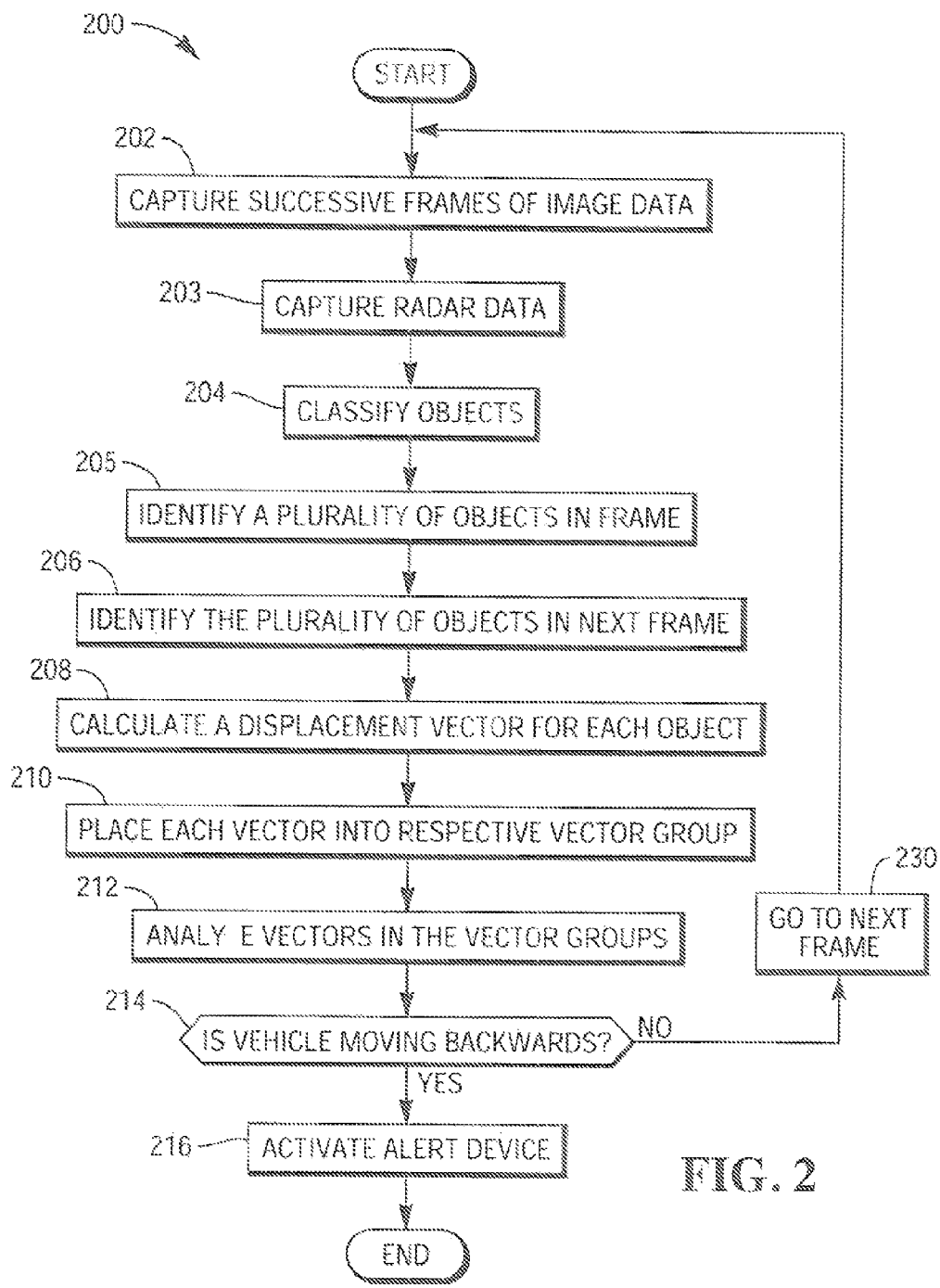
FIG. 2 is a flow diagram depicting a method of operation of the backward movement indicator apparatus of FIG. 1 in accordance with an embodiment.

Referring to FIG. 2, flow diagram 200 depicts operation of apparatus 10 of FIG. 1 in accordance with one embodiment. Program instructions for enabling controller 20 shown in FIG. 1 to perform operation steps in accordance with flow diagram 200 shown in FIG. 2 may be embedded in memory internal to controller 20. Alternatively, or in addition to, program instructions may be stored in memory external to controller 20. As an example, program instructions may be stored in memory internal to a different controller of the vehicle. Program instructions may be stored on any type of program storage media including, but not limited to, external hard drives, flash drives, and compact discs. Program instructions may be reprogrammed depending upon features of the particular controller.

Reference to FIGS. 3A, 3B, and 3C will be made as steps contained in flow diagram 200 are being described hereinbelow. In step 202, camera 12 captures successive frames of images in forward direction of the vehicle. A first frame 40 is shown in FIG. 3A, a second frame 50 is shown in FIG. 3B, and a third frame 60 is shown in FIG. 3C. First frame 40 is captured at a first time, second frame 50 is captured at a second time which is after the first time, and third frame 60 is captured at a third time which is after the second time. As shown in each of FIGS. 3A, 3B, 3C, an imaginary grid 70 is superimposed on top of each image frame. Imaginary grid 70 facilitates visualization of displacement vectors between successive image frames as will be described herein.

In step 203, radar 16 (FIG. 1) captures radar data which is representative of relative locations of a number of objects in front of the vehicle, and stores the captured radar data in radar data memory 18. The captured radar data is then processed to classify the objects in front of the vehicle, as shown in step 204. The captured radar data may be processed to immediately reject some of the objects from consideration, resulting in "bright spots" for use in further image data processing, as will be described in detail hereinbelow. Techniques for capturing radar data and then processing the radar data to classify objects are known and, therefore, will not be described.

In step 205, controller 20 processes first frame 40 (FIG. 3A) of the captured images to identify location of a plurality of objects in first frame 40. As shown in FIG. 3A, three different example objects 41, 42, 43 are shown. The three objects 41, 42, 43 identified in first frame 40 are a subset of the number of objects in front of the vehicle as classified by the captured radar data from step 203. Location of each of the objects 41, 42, 43 in first frame 40 is identified based upon the captured radar data from step 203. Each of the objects 41, 42, 43 comprises a relatively bright spot 41a, 42a, 43a, respectively, in first frame 40. Object 41 is a sport utility vehicle ("SUV"), object 42 is a window of a building 44, and object 43 is a car. The combined use of radar data from radar 16 and image data from camera 12 results in identification of relatively high quality bright spots such as the SUV 41, the window 42, and the car 43.

Bright spot 41a of SUV 41 is represented as a dashed-line circle with its center being, the brightest point of spot 41a. Bright spot 42a of window 42 is represented as a clashed-line circle with its center being the brightest point of spot 42a. Bright spot 43a of car 43 is represented as a dashed-line circle with its center being the brightest point of spot 43a. Building 44 has a roofline 45, a ground line 46, a set of doors 47, and other windows as shown in FIG. 3A. A tree 48 is located next to building. In step 206, controller 20 processes the next image frame (i.e., second frame 50 shown in FIG. 3B) of the captured images to identify locations of the three objects 41, 42, 43.

Then, in step 208, controller 20 calculates a respective displacement vector for each of the three objects 41, 42, 43 based upon comparing the locations of the three objects in the second frame 50 relative to the locations of the three objects in the first frame 40. As shown in FIG. 3B, a displacement vector 51 is associated with first object 41, a displacement vector 52 is associated with second object 42, and a displacement vector 53 is associated with third object 43. More specifically, displacement vector 51 extends between where center of bright spot 41a of object 41 was in first frame 40 (FIG. 3A) and where center of bright spot 41b of object 41 is now in second frame 50 (FIG. 3B). Displacement vector 52 extends between where center of bright spot 42a of object 42 was in first frame 40 (FIG. 3A) and where center of bright spot 42b of object 52 is now in second frame 50 (FIG. 3B). Since object 42 did not move much from its position in first frame 40 shown in FIG. 3A to its new position in second frame 50 shown in FIG. 3B, displacement vector 52 is relatively short and is, therefore, shown as a small dark patch in FIG. 3B. Similarly, displacement vector 53 extends between where center of bright spot 43a of object 43 was in first frame 40 (FIG. 3A) and where center of bright spot 43b of object 53 is now shown in second frame 50 (FIG. 3B).

In step 210, each calculated displacement vector from step 208 is placed into a respective vector group. In this example, displacement vector 51 associated with first object 41 is placed into a first vector group, displacement vector 52 associated with second object 42 is placed into a second vector group, and displacement vector 53 associated with third object 43 is placed into a third vector group.

In step 212, controller 20 analyzes vectors contained in each of the different vectors groups (i.e., in each of the first, second, and third vector groups in this example). A determination is then made in step 214 as to whether the vehicle is moving backwards based upon the analysis of the vectors contained in each of the different vector groups. As an example, vectors are analyzed by comparing lengths and directions of vectors contained in successive image frames to determine if the vehicle is moving backwards. Techniques of vector analysis are known and, therefore, will not be described.

If determination in step 214 is negative (i.e., the vehicle is determined to be not moving backwards), then the process proceeds to step 230 in which the next image frame is retrieved from image data memory 14 (FIG. 1). The process then returns back to step 202 to process this next image frame (i.e., third frame 60 shown in FIG. 3C) in the same manner as just described hereinabove for second frame 50 shown in FIG. 3B.

When process returns back to step 202, controller 20 calculates another respective displacement vector for each of the three objects 41, 42, 43 based upon comparing the locations of the three objects in third frame 60 shown in FIG. 3C relative to the locations of the three objects in the second frame 50 shown in FIG. 3B. As shown in FIG. 3C, displacement vector 61 is associated with first object 41, displacement vector 62 is associated with second object 42, and displacement vector 63 is associated with third object 43. Displacement vector 61 extends between where center of bright spot 41b first object 41 was in second frame 50 (FIG. 3B) and where center of bright spot 41c of object 41 is now in third frame 60 (FIG. 3C). Displacement vector 62 extends between where center of bright spot 42b of second Object 42 was in second frame 50 (FIG. 3B) and where center of bright spot 42c of second object 42 is now in third frame 60 (FIG. 3C). Since object 42 did not move much from its position in second frame 50 shown in FIG. 3B to its new position in third frame 60 shown in FIG. 3C, displacement vector 62 is relatively short and is, therefore, shown as a small dark patch in FIG. 3C. Similarly, displacement vector 63 extends between where center of bright spot 43b of object 43 was in second frame 50 (FIG. 3B) and where center of bright spot 43c of object 43 is now in third frame 60 (FIG. 3C).

Displacement vector 61 associated with first object 41 is placed into the first vector group, displacement vector 62 associated with second object 42 is placed into the second vector group, and displacement vector 63 associated with third object 43 is placed into the third vector group. The first vector group now contains displacement vector 51 shown in FIG. 3B and displacement vector 61 shown in FIG. 3C. The second vector group now contains displacement vector 52 shown in FIG. 3B and displacement vector 62 shown in FIG. 3C. The third vector group now contains displacement vector 53 shown in FIG. 3B and displacement better 63 shown in FIG. 3C.

However, if determination back in step 214 is affirmative (i.e., the vehicle is determined to be moving backwards), the process proceeds to step 216. In step 216, controller 20 sends either a signal to alert device 22 to activate alert device 22 to alert a person that the vehicle is moving backwards or a signal directly to the vehicle bus indicating that the vehicle is moving in reverse to allow the vehicle bus to be read by another controller on the vehicle.

It is understood that the three frames 40, 50, 60 and the imaginary grid 70 shown in FIGS. 3A, 3B, and 3C are shown exaggerated for purposes of description. In actuality, many frames are captured per second, imaginary grid 70 is much finer, and many displacement vectors for objects are calculated. For example, camera 12 may provide images with 640×480 pixel resolution, and may capture images at thirty frames per second, for example. Imaginary grid 70 may comprise a 1:1 grid, for example.

It should be apparent that backward movement of the vehicle is inferred by performing frame-by-frame analysis of displacement vectors which are associated with bright objects contained in successive image frames.

It should also be apparent that either a person in the vehicle (such as the vehicle driver) or a person outside of the vehicle such as a person working in vicinity of the vehicle), or both, are provided with an alert or a warning that the vehicle is moving backwards. The alert or the warning that the vehicle is moving backwards is provided without the use of any wheel speed sensor and without the use of any reverse gear position sensor. A true indication of the vehicle actually moving backwards is thereby provided. The true indication is independent of any signal from a wheel speed sensor and is independent of any signal from a reverse gear position sensor. Accordingly, a true indication of the vehicle moving backwards is provided even though signals from wheel sensors of the vehicle may be inadequate to provide such an indication.

It should further be apparent that the above-described apparatus 10 provides an enhanced automatic backup alerting system for the vehicle, whether the vehicle is backing up intentionally (such as when the vehicle driver is reversing the vehicle), or the vehicle is backing up unintentionally (such as when the vehicle is rolling slowly backwards under influence of gravity). The backup alerting system is automatic in that an alert or a warning may be provided without any intervention by the vehicle driver.

Although the above description describes an embodiment in which pixels representing part of the object itself are identified and processed to calculate displacement vectors, it is conceivable that pixels in the vicinity of the object may be identified and used as reference pixels to calculate displacement vectors for the object. As an example, a pixel which represents the closest road surface adjacent to a pedestrian (i.e., an object) may be used as a first reference pixel to calculate a first displacement vector for this object, and another pixel which represents the closest road surface adjacent to a lamp post (i.e., another object) may be used as a second reference pixel to calculate a second displacement vector for this object. In this example, if a determination is made that both the first and second displacement vectors are increasing in length but the estimated distance between the first and second reference pixels is remaining the same, then a conclusion can be made that the vehicle is moving backwards. Alternatively, or in addition to, if a determination is made that either the first displacement vector or the second displacement vector, or both, are remaining the same but the distance between at least one of the objects and the vehicle is increasing, then a conclusion can be made that the vehicle is moving backwards. Other embodiments are also possible.

Also, although the above description describes three objects being identified in successive image frames, it is conceivable that any number of objects be identified. As an example, only two objects may be identified in successive image frames. Accordingly, it is conceivable that any number of displacement vector groups may be defined and used for determining if the vehicle is moving backwards.

Further, although the above description describes profiles of relatively bright objects being identified in successive frames of images, it is conceivable that profiles of relatively non-bright objects be identified. Objects may be either movable objects or stationary objects. Movable objects (bright and non-bright) include cars, trucks, pedestrians, and motorcycles, for examples. Stationary objects (bright and non-bright) include lamp posts, traffic lights, and sign posts, for examples. These are only examples of objects, and other objects are possible.

Although the above description describes use of one electronic controller, it is conceivable that any number of electronic controllers may be used. As an example, either camera 12 may have its own dedicated electronic controller or radar 16 may have its own dedicated electronic controller, or both may have its own dedicated electronic controller. Moreover, it is conceivable that any type of electronic controller may be used. Suitable electronic controllers for use in vehicles are known and, therefore, have not been described.

Also, although the above description describes controller 20 as continuously processing video image data from camera 12, it is conceivable that image data processing ceases when ground speed of the vehicle exceeds a predetermined speed threshold value. Ground speed of the vehicle can be read from the vehicle bus or from wheel speed sensors. Wheel speed sensors may comprise variable reluctance wheel sensors which begin producing signals when ground speed of the vehicle reaches about three to five miles per hour.

Also, although the above description describes apparatus 10 as comprising a combination of camera 12 and radar 16, it is conceivable that apparatus 10 may include only camera 12 and not a radar. In this case, blocks 16 and 18 shown in FIG. 1 would be omitted, and steps 203 and 204 shown in FIG. 2 would be omitted.

Further, although the above description describes camera 12 as being a video camera which captures real-time image data, it is conceivable that a picture camera which captures still-frames be used. As an example, camera 12 may comprise a color camera which provides single screen shots of color pictures. It should be apparent that a single video frame from a video camera may be thought of as a single screen shot.

Although the above description describes camera 12 being mounted on front of the vehicle (such as on the dashboard), it is conceivable that camera 12 may be mounted at a location which is other than on front of the vehicle. As examples, camera 12 may be mounted on one side of the vehicle or at rear of the vehicle. It is also conceivable that camera 12 captures image data which is representative of objects in vicinity of and in other than front of the vehicle. As an example, camera 12 may capture image data which is representative of objects in back of the vehicle. In this example, rules contained in algorithms for determining if the vehicle is moving backwards need to be modified accordingly based on the fact that objects are now in back of the vehicle and not in front of the vehicle.

Also, although the above description describes apparatus 10 being used in a heavy vehicle such as a truck, it is conceivable that apparatus 10 may be used in a non-heavy vehicle such as a passenger car. It is also conceivable that apparatus 10 may be used in other types of "vehicles" such as busses, airport passenger trams, golf carts, railway cars, bulldozers, fork lifts, and the like where backward movement of the vehicle is possible.

While the present invention has been illustrated by the description of example processes and system components, and white the various processes and components have been described in detail, applicant does not intend to restrict or in any way limit the scope of the appended claims to such detail. Additional modifications will also readily appear to those skilled in the art. The invention in its broadest aspects is therefore not limited to the specific details, implementations, or illustrative examples shown and described. Accordingly, departures may be made from such details without departing from the spirit or scope of applicant's general inventive concept.

What is claimed is:

1. A backward movement indicator apparatus for a vehicle having an alert device, the backward movement indicator apparatus comprising:
   an image capture device arranged to capture image data which is representative of objects in front of the vehicle;
   a radar device arranged to capture radar data which is representative of objects in front of the vehicle; and
   an electronic controller arranged to process the captured radar data to identify a first, second and third stationary objects in front of the vehicle and to compare the of relative positions of the first, second and third stationary objects in a first and second captured image to determine if the vehicle is moving backwards and to provide a signal to activate the alert device which is indicative of the vehicle moving backwards in response to determining the vehicle is moving backward.

2. A backward movement indicator apparatus according to claim 1, wherein the electronic controller arranged to compare the first and second captured images includes the electronic controller arranged to identify the first, second and third stationary objects in the first and second captured images and to calculate a plurality of displacement vectors for each of the first, second and third stationary objects.

3. A backward movement indicator apparatus according to claim 2, wherein the electronic controller arranged to compare the first and second captured images includes the electronic controller arranged to place each of the calculated displacement vectors into a respective vector group which is associated with a respective one of the first, second and third stationary objects.

4. A backward movement indicator apparatus according to claim 1, wherein the combination of the captured radar data and the captured image data comprises a plurality of high quality bright spots which are representative of the first, second and third stationary objects in vicinity of the vehicle.

5. A backward movement indicator apparatus according to claim 1, wherein the electronic controller is arranged to apply the signal to the alert device to alert a person that the vehicle is moving backwards.

6. A backward movement indicator apparatus according to claim 5, wherein the electronic controller arranged to apply the signal includes the electronic controller arranged to apply the signal to the alert device to alert a person in the vehicle that the vehicle is moving backwards.

7. A backward movement indicator apparatus according to claim 5, wherein the electronic controller arranged to apply the signal includes the electronic controller arranged to apply the signal to the alert device to alert a person outside of the vehicle that the vehicle is moving backwards.

8. A backward movement indicator apparatus according to claim 1, wherein the image capture device includes a dedicated controller which communicates with the electronic controller.

9. A backward movement indicator apparatus according to claim 1, wherein the electronic controller is arranged to cease processing of captured image data when ground speed of the vehicle is determined to exceed a predetermined speed threshold value.

10. A non-transitory computer readable medium readable by a computer having a memory, the medium tangibly embodying one or more programs of instructions executable by the computer to perform method steps for processing images of stationary objects in vicinity of a vehicle having an alert device, the method comprising the steps of:
    receiving radar data to classify a first and a second stationary object in vicinity of the vehicle;
    receiving a first image from an image capture device containing the first and second stationary objects in vicinity of the vehicle at a first time;
    receiving a second image containing the first and second stationary objects in the vicinity of the vehicle at a second time which is after the first time; and
    determining if the vehicle is moving backwards based upon (i) a comparison of the relative positions of the first stationary object in the first and second images, and (ii) a comparison of the relative positions of the second stationary object in the first and second images;
    wherein (i) each of the first and second images also contains a third stationary object, (ii) the determining if the vehicle is moving backwards is also based upon the relative positions of the third stationary object in the first and second images, and (iii) sending a signal to activate the alert device occurs when a determination is made that the vehicle is moving backwards based upon the comparison of the relative positions of the first stationary object in the first and second images, the comparison of the relative positions of the second stationary object in the first and second images, and the comparison of the relative positions of the third stationary object in the first and second images.

11. A non-transitory computer readable medium according to claim 10, wherein sending a signal to activate the alert device to alert a person that the vehicle is moving backwards includes sending a signal to activate the alert device to alert either a person in the vehicle that the vehicle is moving backwards or a person outside of the vehicle that the vehicle is moving backwards.

12. A non-transitory computer readable medium according to claim 10, wherein (i) receiving a first image containing first and second stationary objects in vicinity of the vehicle at a first time includes receiving the first image containing the first and second stationary objects in front of the vehicle at the first time, and receiving a second image containing the first and second stationary objects in vicinity of the vehicle at a second time includes receiving the second image containing the first and second stationary objects in front of the vehicle at the second time.

* * * * *